Figure 1:
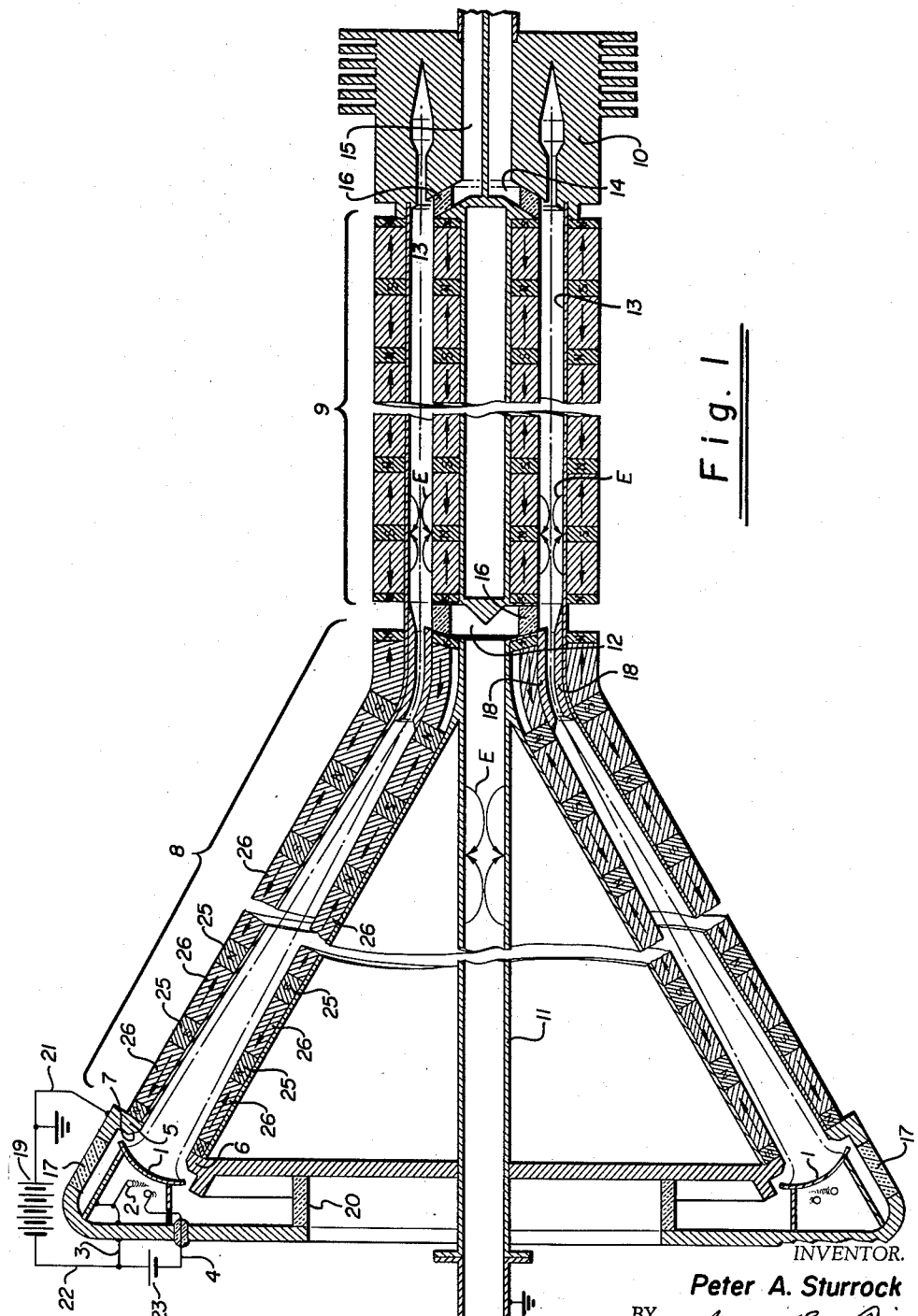

INVENTOR.
Peter A. Sturrock
BY
ATTORNEY

Aug. 27, 1963 P. A. STURROCK 3,102,211
ADIABATIC BEAM CONDENSER METHOD AND APPARATUS
Filed Aug. 19, 1959 5 Sheets-Sheet 2

INVENTOR
Peter A. Sturrock
BY
ATTORNEY

INVENTOR
Peter A. Sturrock

BY
ATTORNEY

INVENTOR
Peter A. Sturrock

INVENTOR
Peter A. Sturrock

United States Patent Office 3,102,211
Patented Aug. 27, 1963

3,102,211
ADIABATIC BEAM CONDENSER METHOD
AND APPARATUS
Peter A. Sturrock, Los Altos, Calif., assignor to Varian Associates, Palo Alto, Calif., a corporation of California
Filed Aug. 19, 1959, Ser. No. 834,724
7 Claims. (Cl. 313—84)

The present invention relates in general to adiabatic beam condenser method and apparatus and more specifically to a novel beam condenser for receiving a beam of charged particles from a suitable gun assembly and for increasing the current density of the beam and delivering it to a suitable utilization circuit without introducing excessive aberrations therein. Such novel adiabatic beam condensers are especially useful in high power, high frequency, velocity modulation tubes, linear accelerators, and the like.

Heretofore, beam condensing structures have been employed between the cathode and beam utilization circuit for increasing the charge density of the beam before applying the beam to the utilization circuit. Generally, these beam condensing structures have comprised a convergent anode assembly in which the physical length of the converging anode was less than a focusing wavelength $\lambda$. The focusing wavelength is defined by the following relationships:

$$\lambda = \frac{2\pi V}{E} \quad (1)$$

or $$\lambda = \frac{2\pi V^{1/2}}{0.3H} \quad (2)$$

where V is the beam voltage; H is the focusing magnetic field intensity in gauss; and E is the focusing electric field intensity in volts/cm. Such prior art relatively short beam condensers operate satisfactorily when relatively small amounts of beam condensation are required such as, for example, for increasing the current density of the beam by a factor of ten. Attempts to extend the use of these relatively short beam condensing members to higher condensing applications results in producing severe aberrations in the electron beam making it generally unsuitable for use in a beam field interaction circuit, since the beam aberrations produce excessive interception of the beam by the interaction structure.

The present invention provides an adiabatic beam condenser which is physically longer than one beam focusing wavelength $\lambda$ and which may be matched at the input end to the gun assembly and matched at the output end to the beam utilization circuit and includes means along its length for progressively increasing the beam focusing force and thereby increasing the current density of the beam. Adiabatic is defined to mean that in increasing the current density of the beam the beam does not gain or lose appreciable energy. The novel adiabatic beam condenser of the present invention is especially useful when employed in tube structures and the like utilizing periodic focusing for confining the beam. In such applications, a substantial increase in the focusing force exerted on the beam by the periodic structure is obtained utilizing a constant focusing potential merely by decreasing the scale of the periodic focusing structure in accordance with corresponding decreases in the beam dimensions due to the condensation thereof.

The principal object of the present invention is to provide a novel adiabatic beam condenser method and apparatus useful, for example, in high frequency, high power velocity modulation tubes, linear accelerators, and the like.

One feature of the present invention is the provision of a novel beam condenser method and apparatus which is physically longer than one focusing wavelength $\lambda$ and in which the focusing force exerted by the condensing apparatus on the beam increases progressively down the length of the beam condenser in accordance with the increase in current density of the beam.

Another feature of the present invention is the provision of a beam condenser apparatus having a longitudinal opening therein for the passage of the beam therethrough, said opening decreasing in height in accordance with the increased charge density of the beam thereby facilitating increase of the focusing field strength employed in accordance with the increase of the current density of the beam.

Another feature of the present invention is the provision of a novel adiabatic beam condenser method and apparatus employing a repetitive periodic focusing force, the period of the focusing force decreasing lengthwise of the beam condenser apparatus in accordance with the increasing charge density of the beam.

Figure 2:
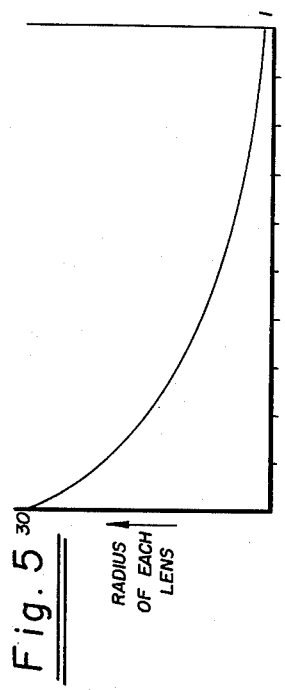
Figure 3:
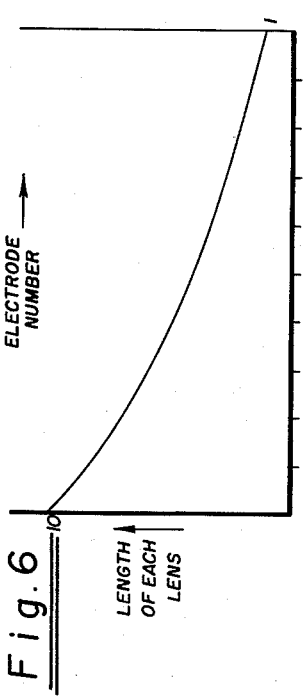
Figure 4:
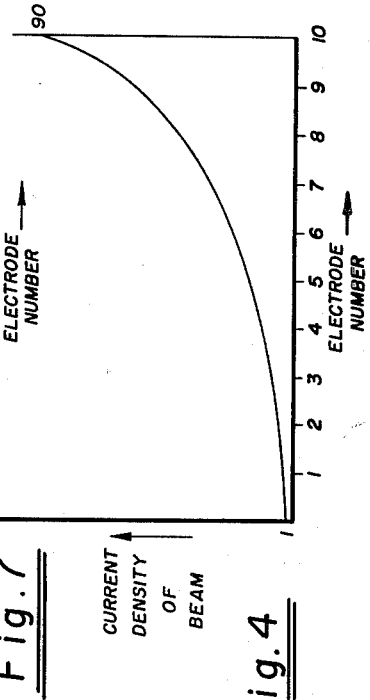
Figure 5:
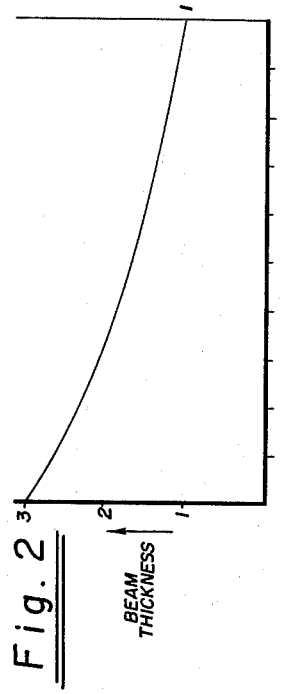
Figure 6:
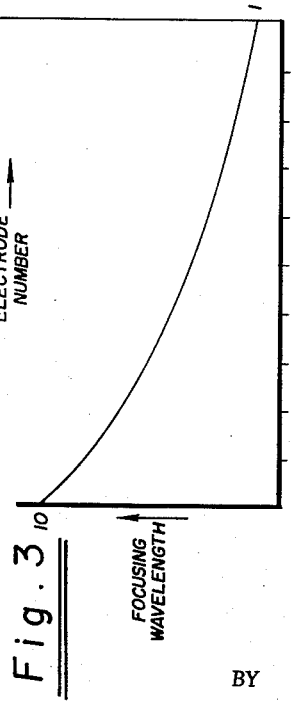
Figure 7:
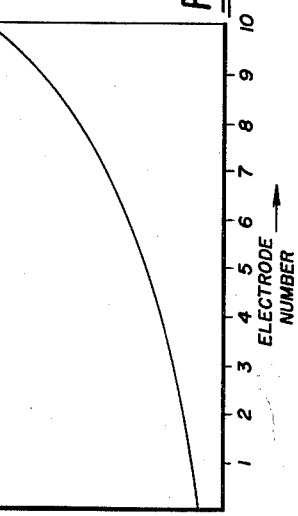
Figure 8:
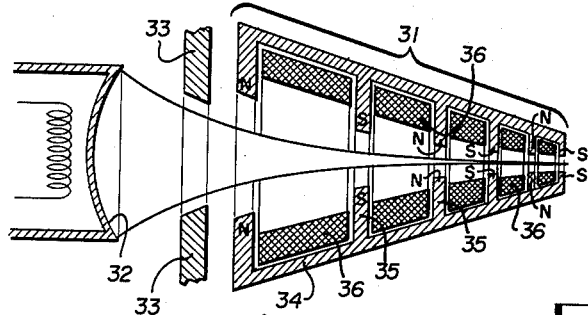
Figure 9:
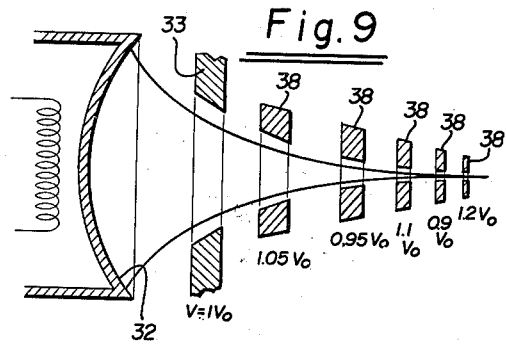
Figure 10:
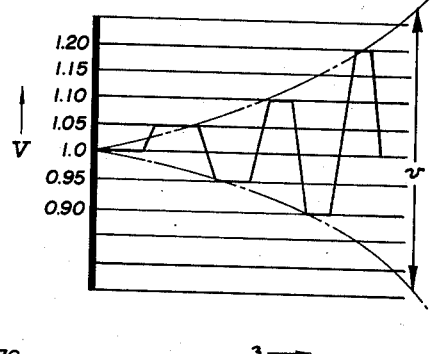
Figure 12:
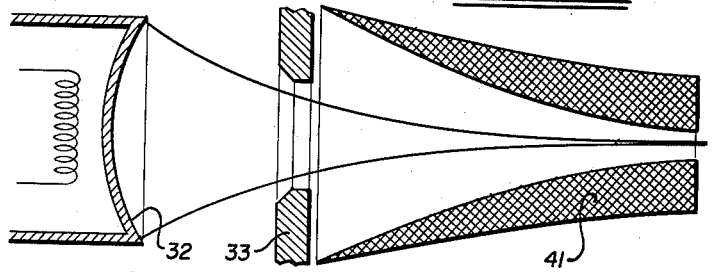
Figure 11:
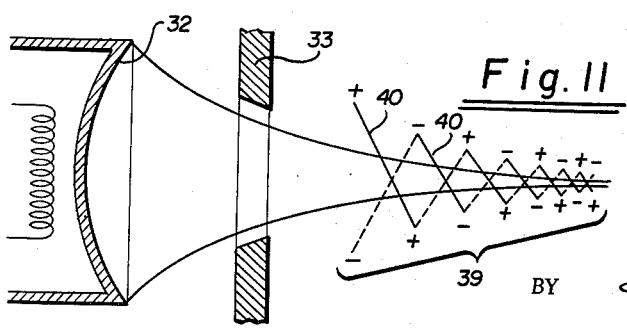
Figure 13:
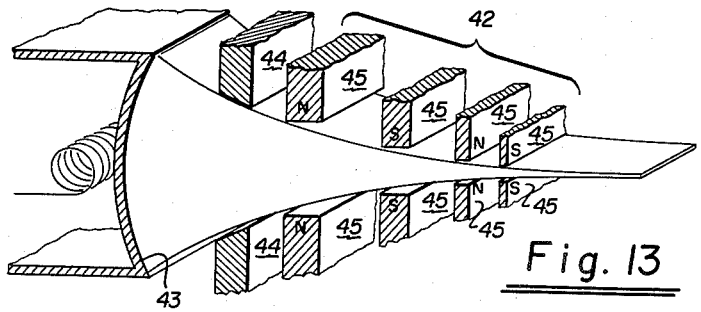
Figure 14:
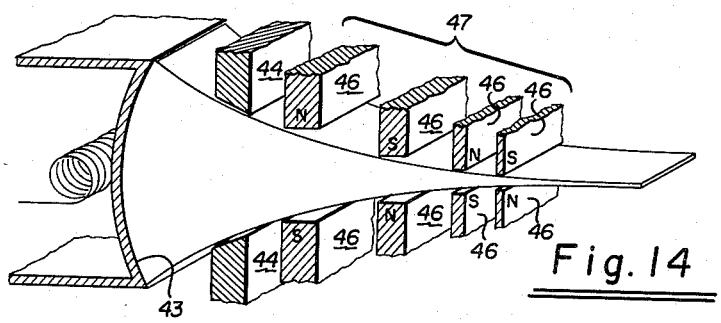
Figure 15:
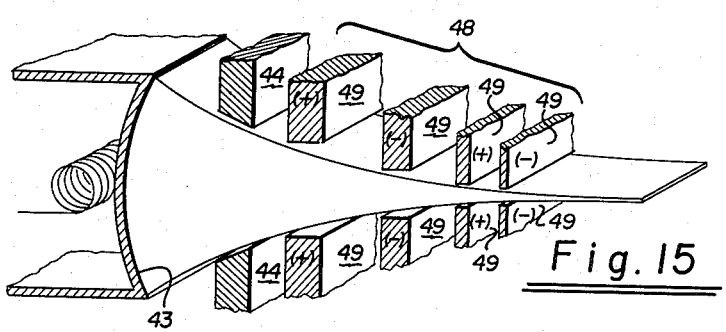
Figure 16:
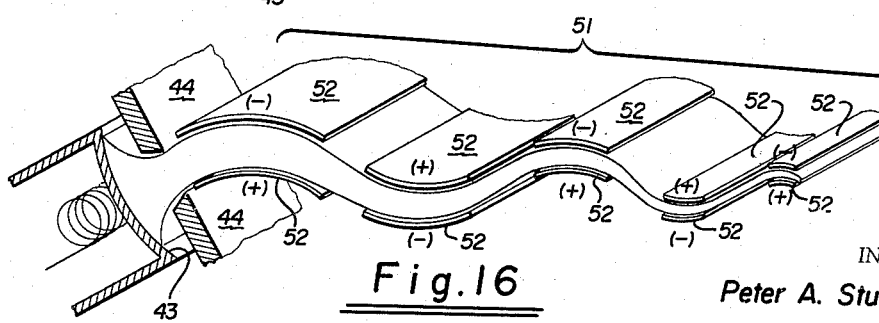
Figure 17:
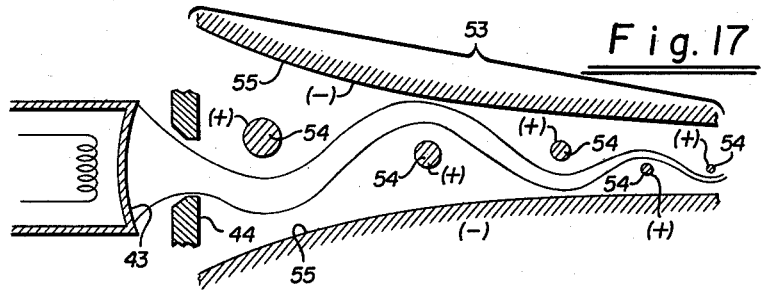
Figure 18:
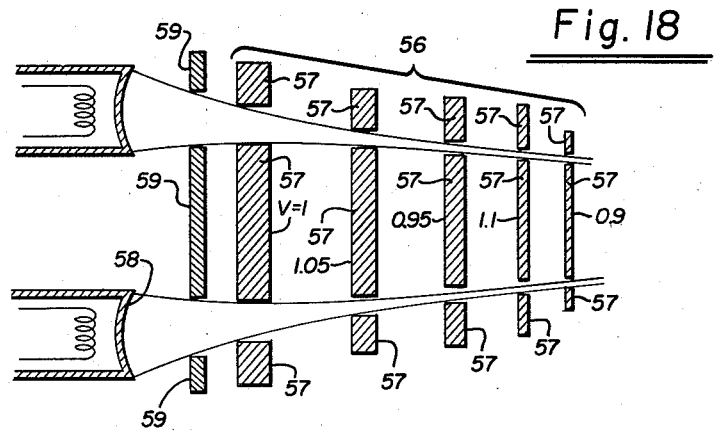
Figure 19:
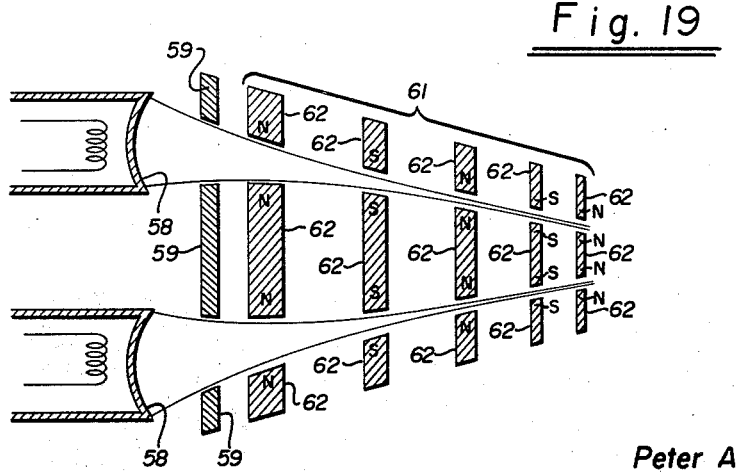

Other features and advantages of the present invention will become apparent upon a perusal of the specification taken in connection with the accompanying drawings wherein, FIG. 1 is a longitudinal cross sectional view of a high frequency, high power velocity modulation electron tube apparatus employing features of the present invention, FIG. 2 shows a graph of beam thickness versus focusing element number for a typical adiabatic beam condenser of the present invention, FIG. 3 shows a graph of beam focusing wavelength as a function of focusing element number for a typical condenser of the present invention, FIG. 4 is a graph of focusing field-strength versus focusing element number for a typical beam condenser of the present invention, FIG. 5 is a graph of the radius of each focusing lens versus focusing element number for a typical condenser of the present invention, FIG. 6 is a graph of length of each focusing lens versus focusing electrode number for a typical condenser of the present invention, FIG. 7 is a graph of beam current density versus focusing electrode number for a typical condenser of the present invention, FIG. 8 shows a longitudinal cross sectional view, partly schematic of a solid beam periodic magnetic adiabatic beam condenser of the present invention, FIG. 9 shows a longitudinal cross sectional view, partly schematic, of a solid beam electrostatic periodic adiabatic beam condenser of the present invention, FIG 10 shows a graph of focusing potential versus length of the condenser of FIG. 9, FIG. 11 is a longitudinal cross sectional view, partly schematic, of a periodic electrostatic solid beam adiabatic beam condenser of the present invention, FIG. 12 shows a longitudinal cross sectional view, partly schematic, of a magnetic solid beam adiabatic condenser of the present invention, FIG. 13 shows a longitudinal cross sectional perspective view, partly schematic, of periodic magnetically focused adiabatic sheet beam condenser of the present invention, FIG. 14 is a longitudinal cross sectional perspective view, partly schematic, of a periodic magnetically focused adiabatic sheet beam condenser of the present invention, FIG. 15 shows a longitudinal cross sectional perspective view, partly schematic, of a periodic electrostatically focused adiabatic sheet beam condenser of the present invention, FIG. 16 shows a longitudinal cross sectional perspective view, partly schematic, of a periodic electrostatic slalom focused sheet beam adiabatic condenser of the present invention, FIG. 17 is a longitudinal cross sectional view, partly schematic, of an electrostatic slalom focused sheet beam adiabatic condenser of the present invention, FIG. 18 is a longitudinal cross sectional view, partly schematic, of a periodic electrostatically focused adiabatic hollow beam condenser of the present invention, and FIG. 19 is a longitudinal cross sectional view, partly schematic, of a magnetic periodically focused adiabatic hollow beam condenser of the present invention.

Referring now to FIG. 1 there is shown a high frequency, high power velocity modulation tube incorporating the adiabatic beam condenser of the present invention. More specifically, an annular cathode button 1 is disposed at the wide end of the tube apparatus and is heated to an operating temperature via heater elements 2 disposed at the back side thereof and supplied with operating potentials via heater leads 3 and 4.

An anode is defined by two concentric annular rings 5 and 6 slightly spaced apart to define an annular gap, the gap being provided with a flared throat portion 7 for drawing the electrons from the cathode emitter 1 and forming them into a hollow conical beam. The conical beam emerging from the anode is picked up by a periodic magnetically focused beam condenser 8 of the present invention. Within the condenser 8 the beam is condensed in thickness as well as in circumference to provide a beam having greatly increased current density at the output end of the beam condenser 8. The beam leaving the condenser 8 is matched to a coaxial magnetic deflection beam focusing structure 9 surrounding the beam field interaction spaces of the tube for maintaining the size and shape of the beam therein. After passing through the periodic magnetic deflection focusing apparatus 9, the beam is collected by annular beam collector 10.

Wave energy, which it is desired to amplify, is fed into the input section of the tube via cylindrical waveguide 11 operating in a suitable TM mode, as shown. The input wave energy then passes through a radial waveguide transducer 12 which transforms the wave energy into a higher order TM mode and propagates it through the coaxial waveguide 13 forming the beam field interaction spaces of the tube apparatus. In coaxial waveguide section 13 the longitudinal electric fields of the TM mode interact with the electron beam to produce amplification of the wave energy by interaction between the running electromagnetic waves in the coaxial waveguide 13 and the azimuthal undulating electrons of the beam. The amplified wave energy is then extracted via radial waveguide transducer section 14 and fed via coaxial line 15 to a suitable load, not shown. The above described tube apparatus which uses interaction between the undulating electrons and waves in a waveguide forms the subject matter of and is claimed in my copending continuation-in-part application divided out of the instant application. The continuation-in-part application is U.S. Serial No. 93,418 filed March 6, 1961 titled, "Fast Wave Tubes Using Periodic Focusing Fields" and assigned to the same assignee as the present invention.

Two annular wave permeable window members 16 as of, for example, alumina ceramic are vacuum sealed at their ends transversely of the radial waveguide transducer sections 12 and 14, respectively, to maintain the vacuum integrity of the vacuum envelope and to support the inner coaxial portion of the magnetic deflection focusing system 9.

Waveguide height restricting members 18 are disposed in the waveguide 13 to reduce the section of coaxial waveguide defined therebetween to a cutoff condition for the desired TM mode such that the injected wave energy will not propagate back up the conical waveguide defined by the coaxial beam condenser section 8.

Suitable operating potentials are applied to the anode members 5 and 6 with respect to the cathode emitter 1 via power supply 19 and leads 21, 22 and 3, respectively. Suitable operating potential and current is supplied to the heater 2 from heater power supply 23 via leads 3 and 4, respectively. The high cathode to anode D.C. potential is held off via annular insulators 17 and 20, respectively, sealed at their ends in a vacuum tight manner to the tube envelope. Power supply 19 preferably has the positive end thereof grounded such that the tube body may be operated at ground potential thereby minimizing the risk to operating personnel.

Referring now to FIGS. 1–7 the novel adiabatic beam condenser 8 of the present invention will be more fully described with regard to a typical example. In particular, as an example, the conical electron beam leaving the gun assembly and entering the periodic coaxial adiabatic beam condenser 8 has a certain initial thickness represented in FIG. 2 as 3 arbitrary units. As the beam progresses down the beam condenser 8, the beam is not only condensed in circumference but is also condensed in thickness to some final beam thickness such as, for example, 1 unit.

The final beam thickness is chosen substantially equal to the beam thickness desired in the beam field interaction circuit 13 and is generally determined by the parameters of the beam focus assembly 9. Thus, if the beam condenser reduces the thickness of the beam by a factor of 3 while reducing the radius of the beam by a factor of, for example 30 (see FIG. 5) the current density of the beam will be increased by a factor of 90 due just to the provision of the beam condenser 8. The use of a 10:1 convergent gun with the above beam condenser 8 will yield a total increase in current density of 900 between the cathode and the beam utilization circuit 13.

Since the beam focusing wavelength is inversely proportional to the square root of the current density of the beam, the beam focusing wavelength will be approximately 10 times longer at the beginning of the condenser 8 than at the termination thereof, as shown in FIG. 3. Conversely, the focusing field strength is directly proportional to the square of the current density of the beam and therefore the focusing field strength required for focusing the beam at the termination of the beam condenser will be approximately 10 times the field strength required at the entrance to the beam condenser 8.

If a periodic focusing structure is utilized for focusing of the beam in the condenser region, the period of the beam condenser structure is preferably matched to the beam focusing wavelength such that the length of each of the periodic beam focusing lenses will vary inversely with the square root of the current density of the beam such that the length of the condenser lenses at the termination of the beam condenser will be approximately 1/10 of the length of the lenses at the initial portion of the beam condenser. It is obvious from the foregoing typical example of a beam condenser yielding an increase in the current density by a factor of 90, that the structure depicted in FIG. 1 is not drawn to scale especially as to the terminating period of the focusing structure.

A substantial increase in the focusing field strength with constant focusing potential is obtained by decreasing the scale of the focusing structure in the principal focusing direction in accordance with the decrease in cross section of the beam whereby the focusing field intensity goes up linearly with decrease in scale.

In the particular example given, wherein the transverse gap spacing is decreased proportionally to the beam thickness, the magnetic focusing potential is also preferably increased progressively throughout the length of the condenser 8, the terminating potential being made approximately three times the magnitude of the initial focusing potential. Thus, by decreasing the focusing gap and by increasing the focusing potential the total focusing field intensity is increased by approximately a factor of 10.

In designing a beam condenser, two current density limiting factors are important. These two factors are the thermal velocities of the charged particles transverse to the direction of the beam and the space charge forces tending to blow up or expand the beam. For solid cylindrical beams thermal velocities of the charged particles become the more important limitation on the ultimate current density of the beam for thin beams focused by strong fields. On the other hand, sheet and hollow cylindrical beams offer the possibility of compressing not only in the direction normal to the beam but also in the direction tangential to the beam which increases the space-charge density without increasing the normal component of thermal velocity. Thus, with a tubular beam, maximum current density, as determined by space-charge limitations, may be approached.

The maximum current density, operating space charge limited, is defined approximately by the following expressions:

$$j \leq 5 \cdot 10^{-6} V^{-1/2} E^2 \quad (3)$$
$$j \leq 10^{-6} V^{-1/2} H^2 \quad (4)$$

where $j$ is equal to current density in amperes per square centimeter; $V$ is the beam voltage; $E$ is the focusing electric field intensity in volts per cm.; and $H$ is the magnetic focusing field intensity in gauss.

The above Equations 3 and 4 may be expressed in terms of focusing wavelength as follows:

$$j \leq 10^{-5} V^{3/2} k^2 \quad (5)$$

where the focusing wavelength $\lambda$ is defined as $$\frac{2\pi}{k}$$

$k$ is related to electric and magnetic focusing field intensities as follows:

$$k = \frac{E}{V} \quad (6)$$

$$k = 0.3 V^{-1/2} H \quad (7)$$

For adiabatic compression of an annular beam the following expression is satisfied:

$$V^{1/2} k x^2 = V_{th}^{1/2} x_c \quad (8)$$

where $x$ is one half the beam thickness; $V_{th}$ is the transverse component of the mean thermal voltage of the charged particles at the entrance to the condenser; and $x_c$ is the beam half thickness at the entrance to the condenser.

For a hollow cylindrical beam $$2\pi R 2xj = 2\pi R_c 2x_c j_c \quad (9)$$

where $j_c$ is the current density at the entrance to the condenser, $R$ is the mean radius of the beam at any point, and $R_c$ is the mean radius of the beam at the entrance to the condenser.

From equations 5, 8 and 9 we obtain:

$$j = \frac{R_c}{R} x_c^{3/4} V_{th}^{-1/4} V^{1/4} k^{1/2} j_c \quad (10)$$

Hence, from Equations 5 and 10 the condenser is designed to satisfy $$\frac{R_c}{R} \leq 10^{-5} x_c^{-3/4} j_c^{-1} V_{th}^{1/4} V^{5/4} k^{3/2} \quad (11)$$

Assuming we utilize, for safety margin, a focusing force in excess of that required by space charge considerations, say four times larger than required, then the current density obtainable under these conditions will be reduced by a certain factor $f$, where $f$ is the ratio of space charge force to focusing force and for the above mentioned safety margin $f = 0.25$.

Thus from equation 5, with safety margin, $$j = f 10^{-5} V^{3/2} k^2 \quad (12)$$

and from Equation 11

$$\frac{R_c}{R} = f 10^{-5} x_c^{-3/4} j_c^{-1} V_{th}^{1/4} V^{5/4} k^{3/2} \quad (13)$$

Eliminating constants from Equation 13 and assuming constant beam voltage through the condenser we find that:

$$R \alpha k^{-3/2} \quad (14)$$

or $$R \alpha \lambda^{3/2} \quad (15)$$

where $\lambda$ is the focusing wavelength.

Since $\lambda$ varies exponentially with element number, the longitudinal position coordinate, $z$, for the individual focusing elements varies exponentially with element number. Hence, we find Equation 15 leads to the following typical radius vs. abscissa physical condenser configuration:

$$R \alpha (z_0 - z)^{3/2} \quad (16)$$

where $z_0$ is the longitudinal distance from the beginning of the condenser to the point where $\lambda$ goes, in the limit, to zero if the condenser could be continued to that point; and $z$ is the longitudinal distance from the entrance of the condenser.

From Equation 8

$$x \alpha k^{-1/2} \quad (17)$$

and so from Equations 14 and 17 we find:

$$R \alpha x^3 \quad (18)$$

The FIGS. 2–7 depict the various parameters of beam thickness, focusing wavelength, focusing field intensity, radius of each lens, length of each lens, and current density of the beam for a typical hollow cylindrical beam condenser of the present invention. For the particular example depicted in the above figures, these parameters are shown as a function of electrode number, there being shown ten electrodes. In a particular design, the number of electrodes chosen may vary widely from 10, the least number required may be best determined empirically. The number of focusing lenses should not be reduced below that point at which excessive perturbations in the beam are produced by the individual focusing lenses.

It should be noted that the above mentioned graphs are shown with the number of electrodes plotted as the abscissa. Since the period of the condensing structure is decreasing in length with decreasing focusing wavelength, the higher numbered electrodes will be physically shorter such that the actual physical configuration of the condenser may have a linear convergent terminating portion or a concave converging termination. Also it should be noted that the electric field intensity or magnetic field intensity, as the case may be, which is utilized for focusing of the beam increases lengthwise of the condenser 8. Of course, this increase in field intensity may be obtained by maintaining a uniform transverse spacing between mutually opposing electrodes and merely increasing the focusing potential applied to the electrodes. However, one easy manner in which to obtain the increased focusing field strength is to decrease the transverse spacing between the electrodes as the beam is condensed in thickness. Thus, in the example shown in FIG. 1 of the drawings, it can be seen that as the period of the structure is decreased, the mutually opposing pole pieces are also brought closer together transversely of the beam. Decreasing the magnetic gap transverse to the beam proportionally increases the focusing field intensity for a certain magnetic potential.

The particular periodic magnetic deflection focusing utilized in the condenser 8 and focusing structure 9 of FIG. 1 is described in greater detail in my co-pending application, Serial No. 793,495, entitled "Magnetic Beam Focusing Method and Apparatus" and which is now U.S. Patent No. 3,013,173 granted December 12, 1961. Briefly, this method of focusing is carried out by coaxially disposed alternating consecutive pairs of magnetic pole pieces 25 and magnets 26 as shown in FIG. 1. This focusing structure directs a periodic magnetic focusing field transversely to the beam path, the sign of the transverse periodic field alternating longitudinally of the beam. In this manner, as the charged particles pass through the alternating transverse portion of the magnetic field they are caused to be alternately transversely deflected in the plane of the beam. This deflection causes the particles to have a certain periodic alternating velocity transverse to the direction of the beam. This transverse velocity of the particles co-acting with the longitudinal fringing fields between the successive transverse field portions produces the inwardly directed focusing force on the particles confining them against transverse motion outwardly of the beam.

For stable beam conditions, it is desirable that the maximum angle $\phi_0$ that the transversely undulating beam particles make with the mean direction of the beam, in the plane of the beam, not exceed 0.86 radians or approximately 50°. $\phi_0$ is related to the beam parameters as follows:

$$\sin \phi_0 = \sqrt{\frac{e}{2_m V_0}} \psi_x \qquad (19)$$

where $e$ is the charge on the particle; $m$ is the mass of the particle, $V_0$ is the beam voltage, and $\psi_x$ is the transverse magnetic flux per unit of beam width due to ½ of any one of the transverse magnetic pole pairs.

Referring now to FIG. 8 there is shown a centrally apertured periodic magnetic beam focused adiabatic condenser 31 which receives therethrough a solid beam from a cathode assembly 32 via centrally apertured anode 33. The condenser 31 includes a convergent tubular magnetic yoke member 34 as of, for example, iron having a plurality of decreasingly longitudinally spaced inwardly directed partitions 35 forming the magnetic poles of the periodic structure. The condenser assembly 31 is energized via a plurality of annular coils 36 disposed between adjacent partitions 35 and energized with current to produce poles of alternating polarity lengthwise of the condenser 31.

In the case of solid cylindrical beams, thermal velocities of the electrons may be more of a limitation to the maximum condensation of the beam, with a given focusing field intensity, than are space charge forces.

The maximum current density per unit of focusing field intensity as given in the above Equations 3 and 4 for space charge limited tubular beams will yield a maximum current density which is somewhat in excess of that which is actually obtainable for a solid beam. However, the same general rules apply, the only difference being that the maximum current density per unit of focusing field intensity obtainable for the solid beam case is slightly less than for sheet beams. This means, as shown in the previous examples, the solid beam periodic focusing structure will have a decreasing period lengthwise of the condenser and an increasing focusing field intensity lengthwise of the condenser, the latter preferably obtained partly by decreasing the transverse gap of the condensing structure lengthwise thereof and partly by increasing the focusing potential.

Referring now to FIG. 9 there is shown an electrostatic periodic solid beam condenser of the present invention in which a plurality of successive focusing ring members 38 are arranged lengthwise of the solid beam coaxially thereof, the spacing between successive ring members 38 decreasing progressively throughout the length of the condenser and the alternating component of focusing electric potential $v$ increasing progressively throughout the length of the condenser as indicated in FIG. 10.

Referring now to FIG. 11 there is shown an electrostatic periodically focused solid beam condenser 39 in which the condenser focusing structure comprises a bifilar helix 40, the two separate helices operating at different potentials, the radius of bifilar helix 40 decreasing with increasing length thereof, and adjacent turns being progressively closer spaced lengthwise thereof. The positive marked helix is preferably operated at a potential somewhat positive with respect to the beam voltage whereas the negatively marked helix is preferably operated at a positive potential but somewhat negative with respect to the beam voltage.

Referring now to FIG. 12 there is shown a magnetic solid beam condenser of the present invention in which an annular solenoid 41 is provided with a flared longitudinal central opening, the solenoid being coaxially disposed of the particle beam with the flared entrance to the solenoid 41 disposed adjacent the anode 33. The windings in the solenoid 41 are proportioned to produce a progressively increasing axial directed focusing magnetic field lengthwise thereof. In addition, the solenoid 41 is chosen to be longer than a beam focusing wavelength.

Referring now to FIG. 13 there is shown a periodically magnetically focused sheet beam condenser 42 employing features of the present invention. More specifically, a concave rectangular cathode button 43 suitably heated for thermal emission emits an electron beam through accelerating anode 44 having a rectangularly shaped opening therein for the passage of the beam therethrough. The magnetic beam condenser 42 includes a plurality of magnetic pole pairs 45 disposed straddling the sheet beam and successive pole pairs 45 being spaced apart longitudinally of the sheet beam, the spacing between adjacent pole pairs decreasing longitudinally of the beam. In a preferred embodiment of this invention the transverse spacing between the pole pairs 45 decreases with increasing condensation of the beam whereby obtainment of increased focusing magnetic field intensity is facilitated. In the embodiment of FIG. 13 the poles 45 making up each transverse pole pair disposed straddling the beam have the same polarity and the sign of successive pole pairs longitudinally spaced of the beam alternates.

Referring now to FIG. 14 there is shown another embodiment of the present invention which is substantially identical to the structure of FIG. 13 with the exception that each pole of a magnetic pole pair 46 disposed straddling the sheet beam has opposite magnetic polarity whereby periodic magnetic deflection focusing of the beam is obtained in the condenser 47.

Referring now to FIG. 15 there is shown an electrostatic periodically focused sheet beam condenser 48 including a plurality of transversely disposed electrode pairs 49, successive electrode pairs 49 being spaced apart longitudinally of the sheet beam. The electrode pairs 49 are operated at a positive potential with respect to the cathode 43 but the potential applied to successive electrode pairs 49 alternates both positive and negative above and below the beam potential longitudinally of the beam. The electric focusing field increases longitudinally of the beam as the period between successive pole pairs 49 decreases. As in the previous examples, the increase in electric focusing field intensity is obtained partly by decreasing the transverse gap spacing and period between successive electrode pole pairs 49 lengthwise of the beam.

Referring now to FIG. 16 there is shown a periodic electrostatic slalom focused beam condenser 51. The slalom focused condenser 51 includes a plurality of concave electrode pairs 52 disposed transversely of and straddling the sheet beam. Successive electrode pairs 52 are spaced longitudinally of the beam and the period between successive pole pairs is decreased longitudinally of the beam. The electrostatic potential applied to each of the pole pairs is more positive than the cathode and in a preferred embodiment one electrode of each pair 52 is at a more positive potential than the beam voltage and its transversely disposed opposite electrode is at a more negative potential than the beam potential. In a preferred embodiment the gap spacing between the electrodes 52 making up each transversely disposed pole pair successively decreases lengthwise of the condenser 51 whereby the focusing electric field intensity is readily increased progressively in accordance with the increase in current density of the beam.

Referring now to FIG. 17 there is shown another embodiment of the present invention including an electrostatic periodic slalom focused sheet beam condenser 53. The condenser 53 includes a plurality of longitudinally spaced transversely directed rod shaped electrodes 54 operated at a more positive potential than two spaced apart conducting sheet members 55 disposed straddling the beam. The gap spacing between the sheet members 55 is decreased progressively down the length of the condenser 53. The sheet members 55 are operated at a potential more negative than the beam potential. The period between successive rod shaped transverse electrodes 54 is decreased lengthwise of the beam. The decreasing spacing between the sheet members 55 causes the electric focusing field intensity to increase progressively down the length of the condenser 53 in accordance with the increase in charge density of the beam.

Referring now to FIG. 18 there is shown an electrostatic periodically focused hollow beam condenser 56 of the present invention. The condenser 56 includes a plurality of successive coaxially disposed electrode pairs 57, the electrodes of each pair adapted to operate at the same potential but successive pairs operated at potentials alternating above and below the beam potential, but at potentials more positive than the cathode 58. Charged particles emitted from the annular cathode 58 are accelerated and directed through an annular gap in the accelerating anode 59 and then projected through the annular gaps defined by successive transversely disposed condenser electrode pairs 57. The longitudinal spacing between successive electrode pairs 57 decreasing longitudinally of the condenser 56 in accordance with the decreasing focusing wavelength. Also in a preferred embodiment, the annular gap of each electrode pair decreases in radial thickness longitudinally of the beam to increase the electric focusing field intensity in accordance with the increased current density of the beam.

Referring now to FIG. 19 there is shown a periodic magnetically focused hollow beam condenser 61 of the present invention. The condenser 61 includes a plurality of concentrically disposed magnetic pole pairs 62 transversely spaced apart to define an annular gap in each pole pair 62 for the passage of the beam therethrough. Successive pole pairs 62 are disposed longitudinally of the beam and alternate in magnetic polarity to provide a periodic longitudinal magnetic focusing structure. The period of the periodic structure 61 decreases lengthwise thereof in accordance with the decrease in focusing wavelength. Also in a preferred embodiment, the annular transverse gap spacing of each pole pair 62 decreases longitudinally of the condenser 61 in accordance with the increased charge density of the beam whereby the focusing magnetic field intensity is readily increased.

Although the previous examples are depicted utilizing constant beam voltage throughout the length of the beam condensers, it should be readily apparent to those skilled in the art that with straightforward modification of the structures an accelerating potential could be applied to the beam condensing structures to increase the beam potential lengthwise of the condenser.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method for increasing the current density of a beam of charged particles including the step of, progressively decreasing the transverse cross sectional area of the beam by at least a factor of 10 and progressively decreasing the beam focusing wavelength in the direction of beam travel over a distance in excess of one focusing wavelength in the direction of beam travel by applying a progressively increasing beam focusing field intensity to the beam in accordance with the decrease in cross sectional area of the beam whereby the current density of the beam is increased.

2. The method according to claim 1 wherein the step of applying a beam focusing field to the beam comprises the step of applying the focusing field periodically at longitudinally spaced apart positions of the beam, the period of the applied focusing field decreasing lengthwise of the beam in accordance with the decrease in cross section of the beam.

3. A charged particle beam condenser apparatus including, means for decreasing the cross sectional area of a stream of charged particles by at least a factor of 10 over a length of beam travel in excess of one focusing wavelength, said means for decreasing the beam cross sectional area including means for directing an increasing beam focusing force onto the particles of the beam, and the focusing force being progressively increased as the cross section of the beam is decreased whereby the beam may be condensed to a relatively high current density without introducing excessive perturbations therein.

4. Apparatus according to claim 3 wherein said means for directing an increasing focusing force onto the beam particles includes an apertured focusing structure having the beam directed through the aperture, the cross-sectional area of the aperture decreasing with decrease of the beam cross sectional area whereby increase in the beam focusing force is facilitated.

5. The apparatus according to claim 3 wherein said means for directing an increasing focusing force onto the beam particles includes, means for periodically focusing the beam, and the period of the focusing means decreasing as the cross section of the beam is decreased.

6. A charged particle beam condenser apparatus for condensing a hollow cylindrical beam including, a beam focusing and condensing structure having a converging annular passage therethrough of a length in excess of one focusing wavelength for accommodating the beam of charged particles, said opening satisfying the following relationship:

$$\frac{R_c}{R} \leq 10^{-5} x_c^{-3/4} j_c^{-1} V_{th}^{1/4} V^{5/4} k^{3/2}$$

where $R_c$ is the mean radius of the opening at the entrance to the annular passage, R is the mean radius of the opening at any given point, $x_c$ is the beam half thickness at the entrance to the annular passage, $j_c$ is the beam current density at the entrance to the annular passage, $V_{th}$ is the transverse component of the mean thermal voltage of the charged particles at the entrance to the annular passage, V is the beam voltage, and $k$ is equal to $$\frac{2\pi}{\lambda}$$

where $\lambda$ is the beam focusing wavelength.

7. The method for condensing a hollow cylindrical beam of charged particles including the steps of, condensing a hollow cylindrical beam of charged particles by a factor of at least 10, performing the beam condensation over a length of the beam in excess of one focusing wavelength in its direction of beam travel, and condensing the beam to satisfy the following relationship:

$$\frac{R_c}{R} \leq 10^{-5} x_c^{-3/4} j_c^{-1} V_{th}^{1/4} V^{5/4} k^{3/2}$$

where $R_c$ is the mean radius of the opening at the entrance to the annular passage, $R$ is the mean radius of the opening at any given point, $x_c$ is the beam half thickness at the entrance to the annular passage, $j_c$ is the beam current density at the entrance to the annular passage, $V_{th}$ is the transverse component of the meam thermal voltage of the charged particles at the entrance to the annular passage, V is the beam voltage, and $k$ is equal to $$\frac{2\pi}{\lambda}$$

where $\lambda$ is the beam focusing wavelength.

References Cited in the file of this patent

UNITED STATES PATENTS

| | | |
|---|---|---|
| 2,812,467 | Kompfner | Nov. 5, 1957 |
| 2,843,776 | Tien | July 15, 1958 |
| 2,855,537 | Mendel | Oct. 7, 1958 |
| 2,857,548 | Kompfner et al. | Oct. 21, 1958 |